United States Patent [19]
Nikjou

[11] Patent Number: 5,918,061
[45] Date of Patent: Jun. 29, 1999

[54] ENHANCED POWER MANAGING UNIT (PMU) IN A MULTIPROCESSOR CHIP

[75] Inventor: Bobby Babak Nikjou, Tempe, Ariz.

[73] Assignee: Intel Corporation, Santa Clara, Calif.

[21] Appl. No.: 08/966,631

[22] Filed: Nov. 10, 1997

Related U.S. Application Data

[63] Continuation of application No. 08/588,285, Jan. 18, 1996, abandoned, which is a continuation of application No. 08/174,770, Dec. 29, 1993, abandoned.

[51] Int. Cl.$^6$ .................................................. G06F 1/00
[52] U.S. Cl. ...................................................... 395/750.06
[58] Field of Search ........................ 395/750.01, 750.08; 364/707

[56] References Cited

U.S. PATENT DOCUMENTS

| | | | |
|---|---|---|---|
| 4,368,514 | 1/1983 | Persaud et al. | 395/200.05 |
| 4,611,289 | 9/1986 | Coppola | 364/492 |
| 4,709,344 | 11/1987 | Crawford | 364/724 |
| 5,025,387 | 6/1991 | Frane | 364/493 |
| 5,086,387 | 2/1992 | Arroyo et al. | 395/550 |
| 5,167,024 | 11/1992 | Smith et al. | 395/375 |
| 5,230,046 | 7/1993 | Iwata et al. | 395/575 |
| 5,274,797 | 12/1993 | Barlow et al. | 395/183.22 |
| 5,345,392 | 9/1994 | Mito et al. | 364/483 |
| 5,349,668 | 9/1994 | Gladstein et al. | 395/750 |
| 5,361,364 | 11/1994 | Nagashige et al. | 395/750.01 |
| 5,388,265 | 2/1995 | Volk | 395/750 |
| 5,390,350 | 2/1995 | Chung et al. | 395/150 |
| 5,396,635 | 3/1995 | Fung | 395/800 |

*Primary Examiner*—Ayaz R. Sheikh
*Assistant Examiner*—Paul R. Myers
*Attorney, Agent, or Firm*—Blakely, Sokoloff, Taylor & Zafman LLP

[57] ABSTRACT

A power management circuit for use with multiple processors integrated on the same chip where one or more of the processors may run at different clock speeds from the others or be stopped. Clock generation circuitry including a power management unit which provides three power management modes, namely power down mode, idle mode and standby mode, plus separate control of each microprocessor core is utilized. In power down mode, the clocks that drive the general purpose processor core, and the other processors and all peripherals are stopped and the oscillator circuit which provides the clock signals to a circuit used to generate the clock phases used by the processors and peripherals are shut off. In idle mode, only the general purpose microprocessor clock is stopped while the peripherals are running. Standby mode is similar to power down mode in that the clocks that drive the general purpose microprocessor and the other processors and all peripheral clocks are stopped. However, unlike power down mode, during standby mode, the oscillator and the associated clock generation circuitry keep running so the part can wake up quickly. In providing for the separate control of the additional microprocessor cores, in addition to allowing the user to stop the additional cores when they are not needed, the additional cores are stopped when the part comes out of a reset thus preventing the additional cores from executing any program code until after the general purpose microprocessor core has completed its initialization and uploaded application program needed by other cores or processor.

19 Claims, 5 Drawing Sheets

ENHANCED POWER MANAGING UNIT (PMU) IN A MULTIPROCESSOR CHIP

This is a continuation of application Ser. No. 08/588,285, filed Jan. 18, 1996, now abandoned, which is a continuation of application Ser. No. 08/174,770, filed Dec. 29, 1993, now abandoned.

BACKGROUND OF THE INVENTION

Field of the Invention

The invention is directed to the field of power management techniques for multiple processors integrated on the same chip.

SUMMARY OF THE INVENTION

The present invention has application with multiple processors integrated on the same chip where one or more of the processors may run at different clock speeds from the others or be stopped. An example of a system where a multiple processor chip of this type may be employed is a general purpose communications processor which may include one or two digital signal processor (DSP) cores and a general purpose microprocessor core as well as associated peripherals such as DMA, timers, UART, arbitration logic as well as on-chip memory.

The present invention is specifically directed to clock generation circuitry including a power management unit which provides three power management modes plus separate control of each DSP core. The three power management modes are power down mode, idle mode and standby mode. In this connection, this description will be directed to a specific multiprocessor chip having a general purpose microprocessor core and two DSP cores integrated on the same die. However, the invention is not limited to the specific environment described, and changes needed to use the invention in other environments should be readily apparent to persons skilled in the art.

To enter any of the three power management modes as well as control of each DSP core, a power management register in the clock generation circuitry is used and an appropriate bit in this register needs to be set. Additionally, a HALT instruction is executed by the general purpose microprocessor if any of the three power management modes needs to be invoked.

In power down mode, the clocks that drive the general purpose processor core and the two digital signal processors and all peripherals are stopped and the oscillator circuit which provides the clock signals to a phase locked loop (PLL) or synchronous delay line (SDL) used to generate the clock phases used by the processors and peripherals are shut off. In this mode, the PLL or SDL is also turned off.

In idle mode, only the general purpose microprocessor clock is stopped while the peripherals are running. A hold/hold acknowledge (HOLD/HOLDA) protocol (as used in Intel x86 architecture) or a DMA request will temporarily take the general purpose microprocessor core out of idle mode so that the general purpose microprocessor core can process the request, after which it goes back into idle mode.

Standby mode is similar to power down mode in that the clocks that drive the general purpose microprocessor and the two digital signal processors and all peripheral clocks are stopped. However, unlike power down mode, during standby mode, the oscillator and the associated clock generation circuitry, i.e., the PLL or SDL keep running so the part can wake up quickly without having to wait through the oscillator start up period or PLL/SDL locking range. The oscillator start up period is typically on the order of 100 milliseconds which is the time it takes a crystal oscillator to reach steady state from the power down mode or from a cold reset. Even if a clock is available from any other source, it still takes approximately 1000-clock cycles for a PLL or SDL to reach lock state. Although 1000-clock cycles is typically less than 100 milliseconds, in high performance applications, even a 1000-clock cycle delay may not be acceptable. A chip reset, NMI or any other interrupt will cause the chip to exit from any of these power management modes.

In providing for the separate control of the two DSP cores, in addition to allowing the user to stop the DSP cores when they are not needed, the present invention causes the DSP cores to stop when the part comes out of a reset thus preventing the DSP cores from executing any program code until after the general purpose microprocessor core has completed its initialization and uploaded the DSP application program.

DETAILED DESCRIPTION OF THE INVENTION

Figure 1:
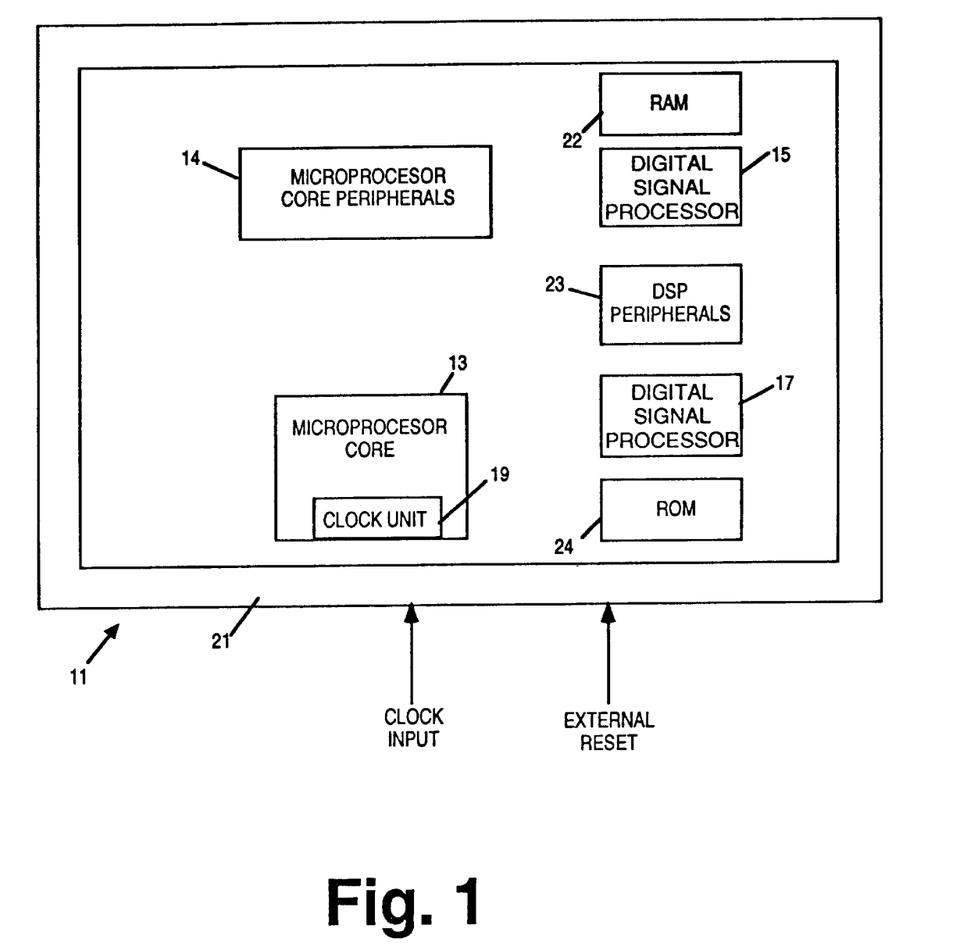
FIG. 1 is a block diagram showing the relationship between the clock unit in which the present invention is utilized and the system which utilizes the generated clocks.

Referring first to FIG. 1, the present invention is used in a multiple processor integrated circuit 11 which includes a microprocessor core 13, a set of core peripherals 14 such as DMA and UART, first and said second digital signal processors 15 and 17, a clock unit 19, a pad ring 21 for inputs to and outputs from the integrated circuit and its components, RAM 22, DSP peripherals 23 such as a viterbi accelerator and ROM 24.

Figure 2:
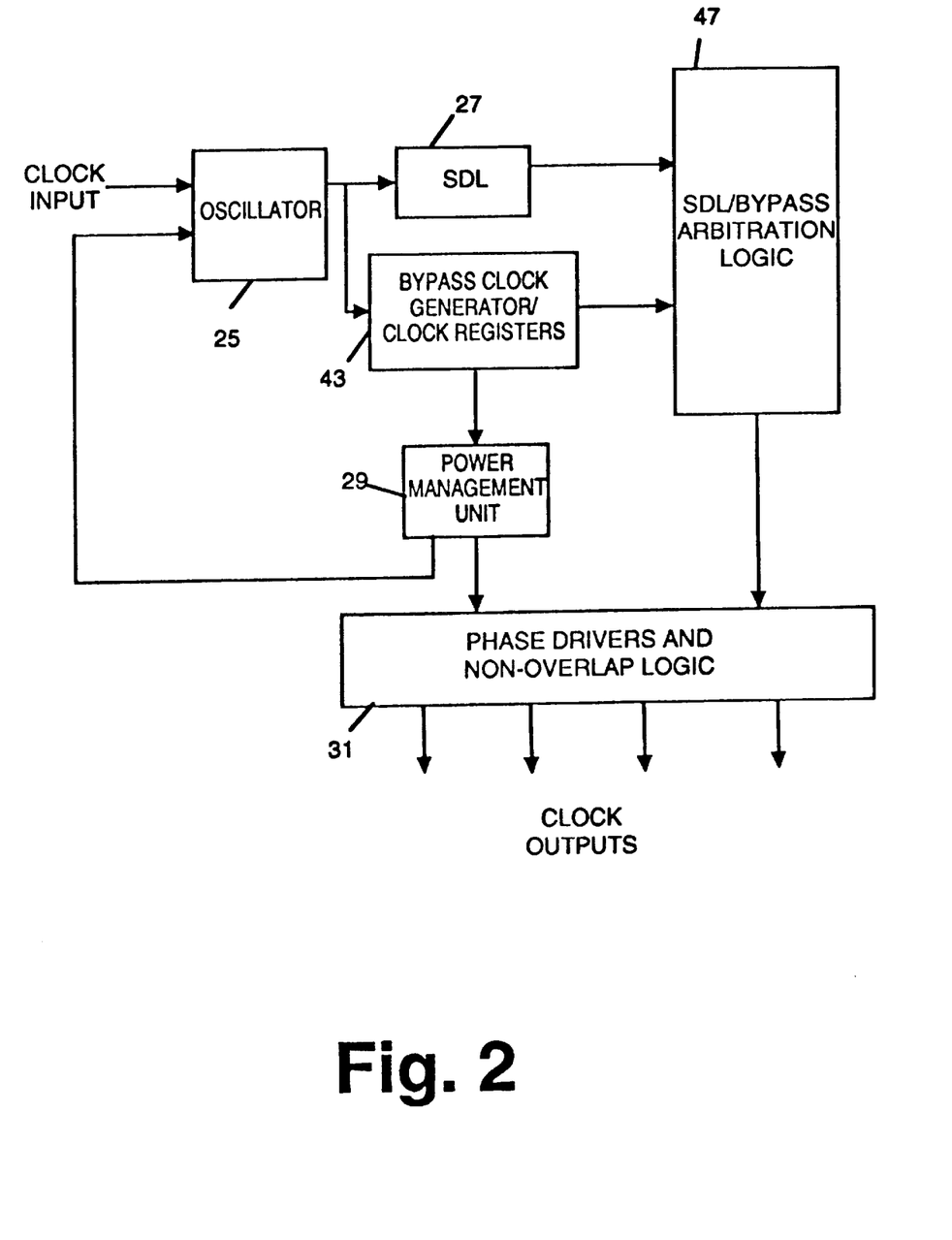
FIG. 2 is an overview block diagram showing the relationship of the power management unit which forms the present invention and the other components of the clock unit.

The present invention mainly lies in providing power management to the chip through a power management unit located in clock unit 19. FIG. 2 shows the elements of the clock unit which comprises oscillator 25 for receiving a clock input, typically from a crystal, and converting it to a clock signal which may be used to generate the various clocks needed by the various components of the chip, a synchronous delay line (SDL) 27 and a bypass clock generator and their associated register set 43 which generates from the oscillator clock signal the necessary clocks needed by the microprocessor 13, digital signal processor 15 and digital signal processor 17, arbitration logic 47 which selects the output of SDL or bypass circuit, the invented power management unit 29 and phase drivers and non-overlap logic circuit 31 which is shown for completeness, but which does not form part of the present invention.

Figure 3:
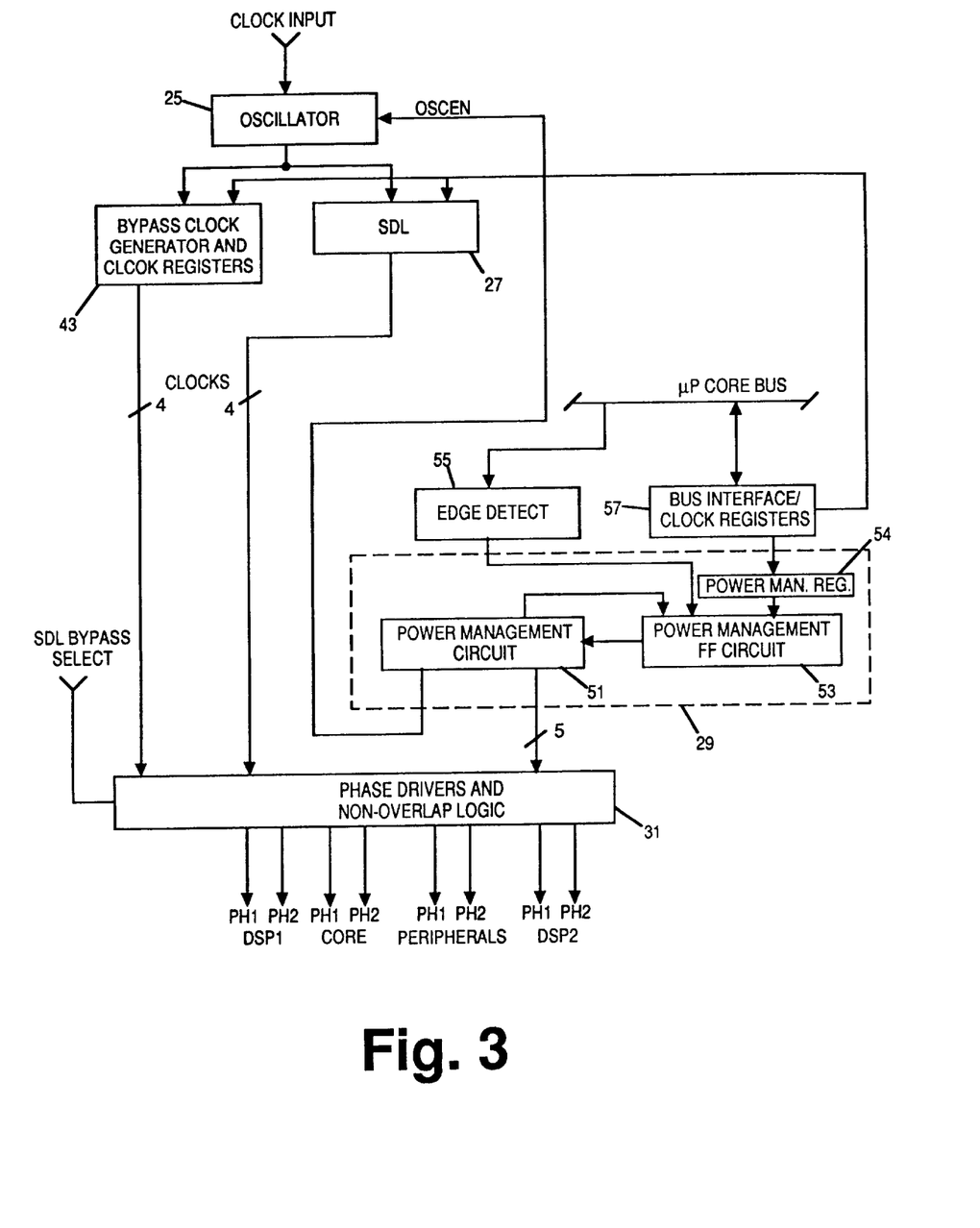
FIG. 3 is detailed block diagram showing the relationship of the power management unit which forms the present invention and the other components of the clock unit.

FIG. 3 is a more detailed view of the clock unit 19. a bypass clock generator 43 receives the clock signal generated by oscillator 25 along with SDL 27. The bypass clock generator 43 and SDL 27 select and pass their outputs, which are programmed by one of the clock registers to select a required frequency multiplication, to SDL/bypass arbitration logic within phase drivers and non-overlap logic 31 which selects the clock signals from either the bypass clock generator 43 or SDL 27. The selected clock signals are then processed by phase drivers and non overlap logic 31 which actually generates phase 1 and phase 2 clocks for the two digital signal processes (DSP1 and DSP2), for the microprocessor core and its peripherals. FIG. 3 also shows the components of the invented power management unit 29, namely power management circuit 51, power management flip-flop circuit 53 and power management register 54. Also shown for completeness are edge detect 55 and bus interface 57 which provides certain signals used by power management unit 29.

Edge detect 55 processes incoming signals from the general purpose microprocessor core on both phase 1 and phase 2 of the clock signal and generates the signals DHLTQ1 (indicating that the general purpose processor has executed a HALT instruction), EIRQQ2 (internal interrupt requested), NEDMAQ1 (DMA request is pending) and EHLDAQ2 (indicating HOLD/HOLDA protocol is active) which are input to power management flip-flop circuit 53. Bus interface 57 provides read/write control signals as well as address and data signals from the general purpose microprocessor core. These signals are then input to power management register 54. When this register is accessed, the power management signals become available for selective entry to any of the power saving features provided by the present invention. The power management register 54 causes the generation of the signals CPUIDLQ1 (CPU idle mode is set), STRSTDQ1 (standby mode is set) and STRTPDQ1 (power down mode is set) which are input to power management flip-flop circuit 53. The power management register 54 also causes the generation of the signals DSP1STOPQ1 and DSP2STOPQ1 indicating which DSP is to be halted. Other inputs to power management flip-flop circuit 53 are NMIQ1 (non-maskable interrupt), NOSCOK (indicating oscillator external timer has timed out, i.e., steady state has been reached), PHOLDQ2 (indicating processor PHOLD protocol is active) and URST (external reset). The details regarding the circuitry used by edge detect 55 and bus interface 57 to generate the signals used by power management circuit 51 and power management flip-flop circuit 53 as well as power management register 54 are not needed for an understanding of the present invention, which details would depend on the particulars of the processors and peripherals involved. However, from the description provided herein with respect to the outputs generated by these blocks which are input to power management circuit 51 and power management flip-flop circuit 53 and power management register 54, a person skilled in the art should be able to implement a suitable edge detect circuit and bus interface circuit, as well as any needed changes to power management circuit 51, power management flip-flop circuit 53 and power management register 54.

Table I below and its associated description specify the functionality of the power management register.

Figure 4:
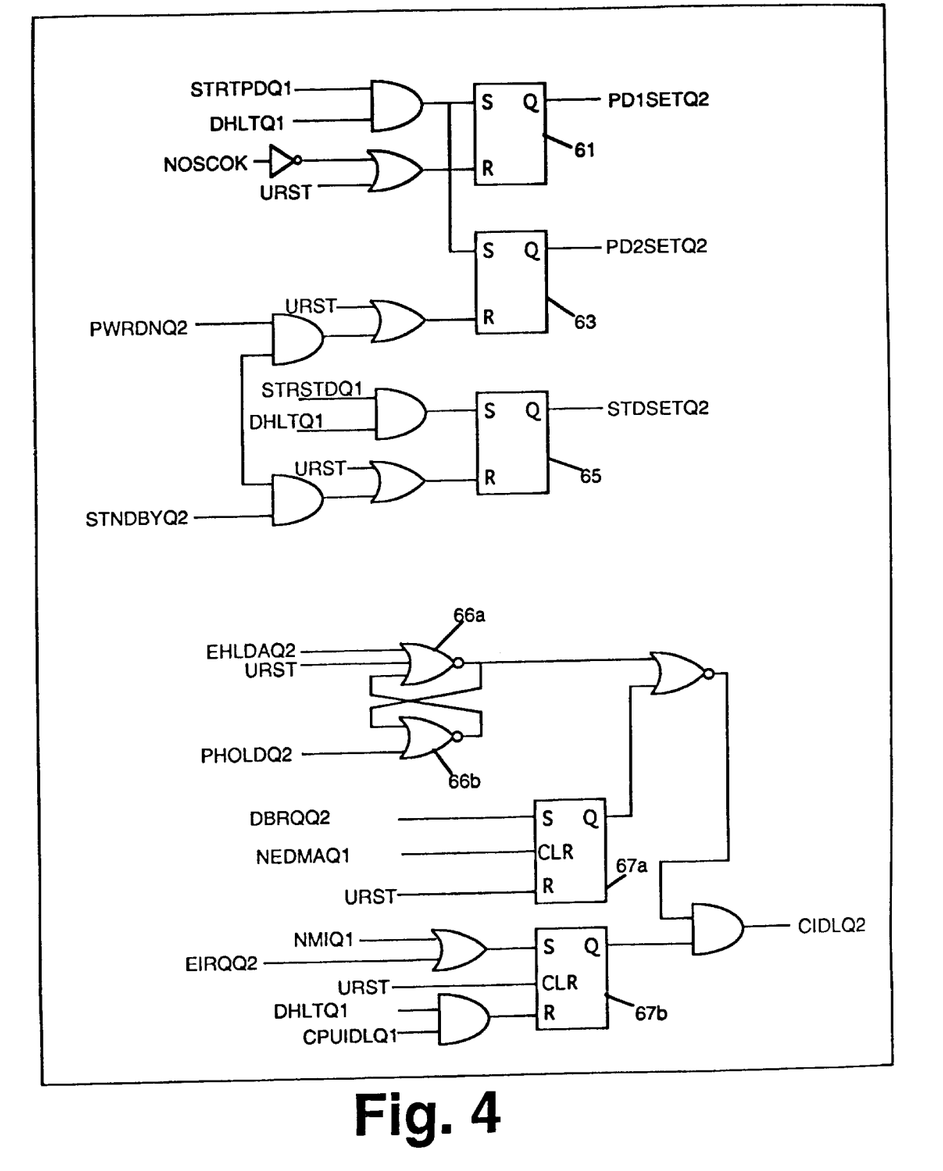
FIG. 4 is a schematic diagram of a power management flip-flop circuit which may be used in the present invention.

Table II is a description of the inputs to the power management flip-flop circuit shown in FIG. 4 specifying the conditions under which each is asserted (active) and deasserted (inactive).

TABLE I

|  |  |  |  |  |  |  |  |  |  |  |  | DSP2 STOP | DSP2 STOP | STNDBY MD | IDLE MD | PWRDN MD |
|---|---|---|---|---|---|---|---|---|---|---|---|---|---|---|---|---|
| bit content | x | x | x | x | x | x | x | x | x | x | x | 1 | 1 | 0 | 0 | 0 |
| bit number | 15 | 14 | 13 | 12 | 11 | 10 | 9 | 8 | 7 | 6 | 5 | 4 | 3 | 2 | 1 | 0 |

The power management register controls the power management modes of the chip as well as the stop bits for the DSPs.

The chip can only be in one power management mode at a time (powerdown, idle, or standby mode); thus no more than one of the three lower bits is set at any given time. If two or three of these bits are set, no power management mode is entered. To enter powerdown mode, using the described implementation, the lower three bits are set to '001. Similarly, to enter idle and standby modes, the lower three bits are set to '010 and '100 respectively. Power management modes are not actually entered until a halt instruction is executed by the general purpose microprocessor.

To stop a DSP core, a '1 is written to bit 3 (for DSP1) or to bit 4 (for DSP2). To start a DSP, a zero is written to the same bit or bits. A '0 will be written to one of these bits by an unmasked DSP interrupt.

During reset, all five bits of the power management register are cleared, allowing all modules to be clocked for initialization purposes. When reset is deasserted, bits 4 and 5 are set to '1 so that the DSP cores are stopped prior to their executing program code. The remaining bits in this register are unused and reserved for future comparability.

TABLE II

Figure 5:
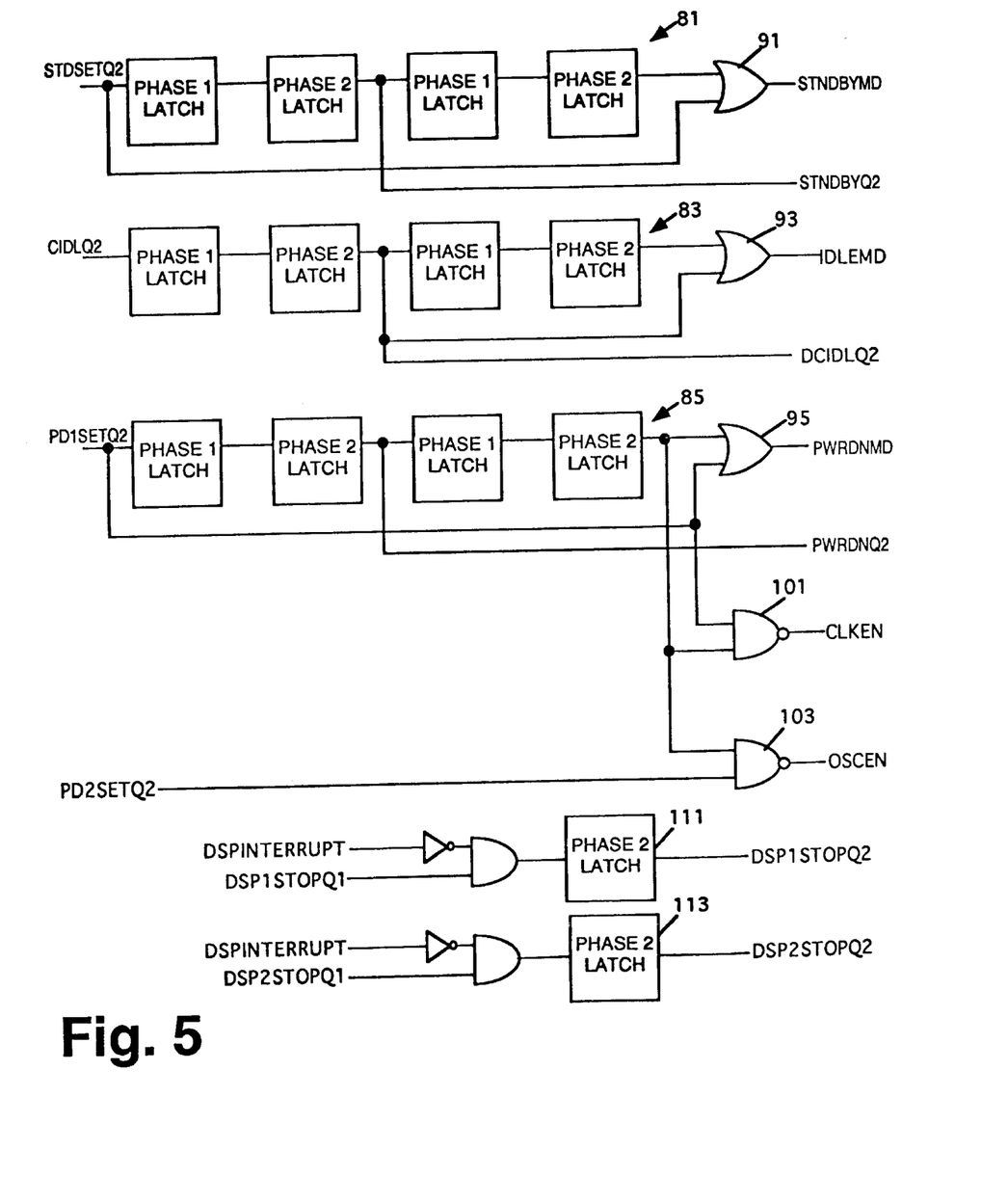
FIG. 5 is a schematic diagram of a power management circuit which may be used in the present invention.

| Signal (From) | Active Condition | Inactive Condition |
|---|---|---|
| CPUIDLQ1 (57) | idle mode bit is set | idle mode bit is reset |
| DBRQQ2 (DMA) | DMA request pending | no DMA request is pending |
| DHLTQ1 (55) | halt instruction issued by general purpose processor | no halt instruction issued |
| EIRQQ2 (55) | Pending interrupts | No pending interrupts |
| NEDMAQ1 (55) | DMA cycle in progress | no DMA activities |
| EHLDAQ2 (55) | HOLD/HOLDA protocol in progress | no HOLD/HOLDA protocol in progress |
| NMIQ1 (pad) | non-maskable interrupt generated | no non-maskable interrupt generated |
| NOSCOK (pad) | Oscillator has reached steady-state | System reset |
| PHOLDQ2 (pad) | processor PHOLD protocol in progress | general purpose μprocessor is a true bus master |
| PWRDNMD (51) | see description of FIG. 5 below | |
| STNDBYMD (51) | see description of FIG. 5 below | |
| IDLEMD | see description of FIG. 5 below | |

TABLE II-continued

| Signal (From) | Active Condition | Inactive Condition |
|---|---|---|
| (51) STRSTDQ1 | standby mode bit is set | standby mode bit is reset |
| (57) STRTPDQ1 | power down mode bit is set | power down mode bit is reset |
| (57) URST (pad) | external user reset | no external user reset |

The outputs generated by the power management flip-flop circuit which are provided to the power management circuit, namely PD1SETQ2, PD2SETQ2, STDSETQ2 and CIDLQ2 are produced by the logic circuits shown in FIG. 4 based upon the inputs described in Table I. Although it should be apparent from FIG. 4 and Table I the conditions under which each of the signals is asserted and deasserted, the following sets forth a more generalized description of these signals.

PD1SETQ2 and PD2SETQ2 are used to indicate the initiation of power down mode. That is, when flip-flop 63 toggles, PD2SETQ2 is active indicating the power down mode bit is set. To avoid glitches when entering or exiting power down mode, PD1SETQ2 and PD2SETQ2 are used in conjunction with power management circuit 51 to perform an edge detect of power down mode inputs.

STDSETQ2 is used to indicate that the standby mode bit is set. That is, when flip-flop 65 toggles, STDSETQ2 is active indicating that the standby mode bit is set.

CIDLQ2 is used to indicate that the idle mode bit is set. CIDLQ2 is asserted by ANDing together the output of flip-flops 67a and NOR gate 71, one of whose inputs is the Q output of flip-flop 67a, the other input being the outputs of NOR gates 66a and 66b which operate to produce a temporary exit from idle mode.

Referring now to FIG. 5, the PD1SETQ2, PD2SETQ2, STDSETQ2 and CIDLQ2 signals generated by the power management flip-flop circuit are input to a set of latches 81, 83 and 85 respectively, each set of latches designated in FIG. 5 as phase 1 latches and phase 2 latches. These latches together with OR gates 91, 93 and 95 coupled to latches 81, 83 and 85 respectively, constitute edge detect circuits that operate to provide a glitch free entry to and exit from power down mode.

The latch set 81 and OR gate 91 generate the signal STNDBYMD, which is passed to the pad ring to indicate that standby mode has been entered, and STNDBYQ2 which is passed to phase drivers and non-overlap logic 31 which uses this signal to inhibit the clocks to all the processors emanating from phase drivers and non-overlap logic 31.

The latch set 83 and OR gate 93 generate the signal IDLEMD, which is passed to the pad ring to inform the user that idle mode has been entered, and DCIDLQ2 which is passed to phase drivers and non-overlap logic 31 which uses this signal to inhibit the general purpose microprocessor peripheral clock to the peripherals emanating from phase drivers and non-overlap logic 31.

The latch set 85 and OR gate 95 generate the signal PWRDNMD, which is passed to the pad ring to indicate that power down mode has been entered, and PWRDNQ2 which is passed to power management flip-flop circuit 53 and phase drivers and non-overlap logic 31 which uses this signal to shut off all the clocks emanating from phase drivers and non-overlap logic 31.

Latches 111 and 113 are used to generate the signals DSP1STOPQ2 and DSPSTOPQ2 indicating which DSP core is to be halted. The provision to clear these bits asynchronously are made possible by adding the DSP interrupt pending signal (DSPINTERRUPT) which is inverted prior to the ANDing with DSP1STOPQ1 for input to latch 111 and with DSP2STOPQ1 for input to latch 113.

The details regarding how the STNDBYQ2, DCIDLQ2, PWRDNQ2, DSP1STOPQ2 and DSPSTOPQ2 signals are used by phase drivers and non-overlap logic 31 are not critical to an understanding of the present invention, but such details may be found in co-pending application Ser. No. 08/175,621 filed Dec. 29, 1993.

Latch set 85 also provides the delayed PD1SETQ2 signal to NAND gate 101 which generates the signal CLKEN. The delayed PD1SETQ2 signal and the PD2SETQ2 signal are input to NAND gate 13 which generates the signal OSCEN. The signal CLKEN, when asserted, enables SDL 27. The signal OSCEN, when asserted, enables oscillator 25.

I claim:

1. A multiple microprocessor integrated circuit including power management circuitry, said power management circuitry comprising:

a power management flip-flop circuit having i) a first flip-flop which in one state generates a first initiation signal indicating initiation of a power down mode;

ii) a second flip-flop which in one state generates a second initiation signal indicating initiation of a standby mode; and iii) a third flip-flop which in one state generates a third initiation signal indicating initiation of an idle mode, wherein said first, second and third initiation signals are generated to provide a controlled exit from and entry to said power down mode and iv) a power management circuit for latching and delaying said first, second and third initiation signals to generate suitable signals for use in controlling a first, a set of second and third clock signals.

2. The integrated circuit defined by claim 1 further comprising:

a) a clock unit, b) a general purpose microprocessor coupled to said clock unit which receives said first clock signals from said clock unit, c) at least one additional microprocessor coupled to said clock unit, each of which receives one of said set of second clock signals from said clock unit, d) a set of peripherals coupled to said clock unit which receives said third clock signals from said clock unit, wherein said general purpose microprocessor, said power management circuitry means and said at least one additional microprocessor are integrated on one chip.

3. The integrated circuit defined by claim 2 wherein said power management circuitry further comprises:

a power management register coupled to said power management flip-flop circuit for indicating whether said integrated circuit is to be in a selected one of said power down mode, said standby mode and said idle mode and whether each of said at least one additional microprocessors is to be halted.

4. The integrated circuit defined by claim 2 wherein said power management circuitry operates to control said first clock signals, said third clock signals and said set of second clock signals independently such that at least one of said first, said set of second and said third clock signals is active while at least one other of said first, said set of second and said third clock signals is inactive, and said at least one additional microprocessor is separately controlled such that when the integrated circuit receives an external reset signal, each of said at least one additional microprocessors is stopped until after at said general purpose microprocessor has been initialized and uploaded its application program.

5. The integrated circuit defined by claim 3 wherein said power management flip-flop circuit further comprises:
   a) a first input coupled to said power management register for receiving from said power management register a first entry signal indicating said power down mode is to be entered and generating first and second signals indicating the initiation of said power down mode;
   b) a second input coupled to said power management register for receiving from said power management register a second entry signal indicating said standby mode is to be entered and generating a third signal indicating the initiation of said standby mode;
   c) a third input coupled to said power management register for receiving from said power management register a third entry signal indicating said idle mode is to be entered and generating a fourth signal indicating the initiation of said idle mode.

6. The integrated circuit defined by claim 5 wherein said power management circuit comprises:
   a) first latch set means for receiving said first signal and said second signal and generating a power down mode signal indicating entry into said power down mode and a clock enable signal for enabling and disabling a clock in said clock unit and an oscillator enable signal for enabling and disabling an oscillator in said clock unit;
   b) second latch set means for receiving said third signal and generating a standby mode signal indicating that said standby mode has been entered;
   c) third latch set means for receiving said fourth signal and generating an idle mode signal indicating that said idle mode has been entered.

7. An integrated circuit having multiple processor cores and power management circuitry wherein said multiple processor cores and said power management circuitry are integrated on one chip and further wherein one of said multiple processor cores is a main processor core and the other of said multiple processor cores are additional processor cores and said power management circuitry comprises:
   power management flip-flop circuit including
   i) a first flip-flop which in one state generates a first initiation signal indicating initiation of a power down mode;
   ii) a second flip-flop which in one state generates a second initiation signal indicating initiation of a standby mode; and
   iii) a third flip-flop which in one state generates a third initiation signal indicating initiation of an idle mode, wherein said first, second and third initiation signals are generated to provide a controlled exit from and entry to said power down mode and
   iv) power management circuit for latching and delaying said first, second and third initiation signals to generate suitable signals for use in controlling a first, a set of second and third clock signals.

8. The integrated circuit defined by claim 7 further comprising:
   a power management register coupled to said power management flip-flop circuit for indicating whether said integrated circuit is to be in a selected one of said power down mode, said standby mode and said idle mode and whether each of said additional microprocessors is to be halted.

9. The integrated circuit defined by claim 7 wherein said power management circuit operates to control a set of clock signals independently such that at least one of said independently controlled clock signals is active while at least one other of said independently controlled clock signals is inactive and said at least one additional microprocessor is separately controlled such that when the integrated circuit receives an external reset signal, each of said at least one additional microprocessors is stopped until after said general purpose microprocessor core has been initialized and uploaded its application program.

10. The integrated circuit defined by claim 8 wherein said power management flip-flop circuit further comprises:
    a) a first input coupled to said power management register for receiving from said power management register a first entry signal indicating said power down mode is to be entered and generating first and second signals indicating the initiation of said power down mode;
    b) a second input coupled to said power management register for receiving from said power management register a second entry signal indicating said standby mode is to be entered and generating a third signal indicating the initiation of said standby mode;
    c) a third input coupled to said power management register for receiving from said power management register a third entry signal indicating said idle mode is to be entered and generating a fourth signal indicating the initiation of said idle mode.

11. The integrated circuit defined by claim 10 wherein said power management circuit comprises:
    a) first latch set means for receiving said first signal and said second signal and generating a power down mode signal indicating entry into said power down mode and a clock enable signal for enabling and disabling an external clock and an oscillator enable signal for enabling and disabling an external oscillator;
    b) second latch set means for receiving said third signal and generating a standby mode signal indicating that said standby mode has been entered;
    c) third latch set means for receiving said fourth signal and generating an idle mode signal indicating that said idle mode has been entered.

12. The integrated circuit defined by claim 2 wherein each of said at least one additional microprocessor is a digital signal processor.

13. The integrated circuit defined by claim 7 wherein each of said additional processor cores is a digital signal processor.

14. The integrated circuit defined by claim 4 wherein said first latch set means comprises a plurality of latches, one of which is coupled to one input of an OR gate, and a second of which is coupled to a second input of said OR gate.

15. The integrated circuit defined by claim 4 wherein said second latch set means comprises a plurality of latches, one of which is coupled to one input of an OR gate, and a second of which is coupled to a second input of said OR gate.

16. The integrated circuit defined by claim 4 wherein said third latch set means comprises a plurality of latches, one of which is coupled to one input of an OR gate, and a second of which is coupled to a second input of said OR gate.

17. The integrated circuit defined by claim 11 wherein said first latch set means comprises a plurality of latches, one of which is coupled to one input of an OR gate, and a second of which is coupled to a second input of said OR gate.

18. The integrated circuit defined by claim 11 wherein said second latch set means comprises a plurality of latches, one of which is coupled to one input of an OR gate, and a second of which is coupled to a second input of said OR gate.

19. The integrated circuit defined by claim 11 wherein said third latch set means comprises a plurality of latches, one of which is coupled to one input of an OR gate, and a second of which is coupled to a second input of said OR gate.

* * * * *